United States Patent
Nakagawa

(10) Patent No.: US 7,877,427 B2
(45) Date of Patent: Jan. 25, 2011

(54) PRINTING APPARATUS AND CONTROL METHOD THEREOF

(75) Inventor: Isamu Nakagawa, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 420 days.

(21) Appl. No.: 12/024,016

(22) Filed: Jan. 31, 2008

(65) Prior Publication Data

US 2008/0288507 A1    Nov. 20, 2008

(30) Foreign Application Priority Data

Feb. 7, 2007    (JP) ............................... 2007-028446

(51) Int. Cl.
*G06F 17/30*    (2006.01)

(52) U.S. Cl. ...................... 707/899; 358/1.13; 358/1.16

(58) Field of Classification Search .................... 707/10; 358/1.13–16

See application file for complete search history.

(56) References Cited

U.S. PATENT DOCUMENTS

| | | | |
|---|---|---|---|
| 5,596,390 A * | 1/1997 | Sawada | 399/8 |
| 6,597,469 B1 * | 7/2003 | Kuroyanagi | 358/1.15 |
| 7,177,034 B2 * | 2/2007 | Nakagawa et al. | 358/1.14 |
| 7,362,461 B2 * | 4/2008 | Reddy et al. | 358/1.15 |
| 7,538,901 B2 * | 5/2009 | Sugishita et al. | 358/1.16 |
| 7,545,528 B2 * | 6/2009 | Takabayashi et al. | 358/1.15 |
| 2004/0252337 A1 * | 12/2004 | Takabayashi et al. | 358/1.15 |
| 2005/0071495 A1 * | 3/2005 | Kadota | 709/232 |
| 2007/0273915 A1 | 11/2007 | Nakagawa | |

FOREIGN PATENT DOCUMENTS

JP    2003-316458    11/2003

OTHER PUBLICATIONS

Bergman R., Hastings T., Isaacson S., Lewis H., Job Monitoring MIB-V1.0, Nov. 1999, RFC Editor.*

* cited by examiner

*Primary Examiner*—Sheree Brown
(74) *Attorney, Agent, or Firm*—Fitzpatrick, Cella, Harper & Scinto

(57) ABSTRACT

A printing apparatus manages identifiers of accounting destinations of print jobs. With a Web browser, a client can set update settings (update rules) of an identifier list saved in an identifier saving unit (of a device. An identifier update unit obtains an identifier list from another device, and updates the identifier list by adding or synchronizing identifiers included in the obtained identifier list in accordance with the update settings.

18 Claims, 20 Drawing Sheets

| ITEM | EXAMPLE |
|---|---|
| START TIME | 2005/11/19 17:48:30 |
| END TIME | 2005/11/19 17:50:40 |
| USER NAME | Yamada |
| DEPARTMENT NAME | DESIGN DEPARTMENT |
| DOCUMENT NAME | USER_NEEDS_SURVEY.doc |
| NUMBER OF LOGICAL PAGES | 12 |
| PAPER SIZE | A4 |
| NUMBER OF PAPER SHEETS | 6 |
| NUMBER OF PAGES | 6 |
| PAGE LAYOUT | 2 |
| COLOR MODE | COLOR |
| DOUBLE / SINGLE SIDED | SINGLE SIDED |
| IDENTIFIER (CLIENT) | XXX CONSTRUCTION |
| IDENTIFIER (MATTER) | PRELIMINARY SURVEY |
| IDENTIFIER (SUB MATTER) | P TOWN BUILDING COVERAGE |
| JOB ID | ABCD |

801 — IDENTIFIER (CLIENT)
802 — IDENTIFIER (MATTER)
803 — IDENTIFIER (SUB MATTER)
804 — JOB ID

| LAYER NAME | IDENTIFIER | GROUP | USER |
|---|---|---|---|
| CLIENT | ABC DESIGN | KANAGAWA G | OSUGI |
| CLIENT | BCD CONSTRUCTION | KANAGAWA G | OSUGI |
| SUB MATTER | PRELIMINARY SURVEY | KANAGAWA G | NAKASUGI |
| SUB MATTER | IN-DEPTH SURVEY | KANAGAWA G | KOSUGI |
| MATTER | ESTIMATION | KANAGAWA G | KOSUGI |
| MATTER | FIRST PLAN | KANAGAWA G | KOSUGI |

FIG. 11

```
<Insert>       1101
    <Layer>CLIENT</Layer>    1102
    <Name>XYZ KENCHIKU</Name>
    <Who>              1103
        <UserName>OSUGI</UserName>    1104
        <GroupName>KANAGAWA GROUP</GroupName>
    </Who>
</Insert>
```

PRINTING APPARATUS AND CONTROL METHOD THEREOF

BACKGROUND OF THE INVENTION

1. Field of the Invention

The present invention relates to a printing apparatus included in, for example, a printer, copying machine, multi function peripheral (MFP), and the like, and a control method thereof.

2. Description of the Related Art

In recent years, some copying machines have not only a function of copying documents but also a function of executing a print job received from an external client. Furthermore, some copying machines have a function of digitally transmitting a scanned document to an external device using an e-mail or file transfer function. A copying machine having these functions is called an MFP (Multi Function Peripheral).

When peripheral devices such as a copying machine, MFP, printer, and the like and, especially, an output device, are used, one may ask a third party for a use charge of the peripheral device. For example, this is the case in which an advertising agency or law firm asks a customer for an actual cost of a work which was done based on a request from the customer.

Conventionally, an accounting system which calculates an actual cost is available (for example, see Japanese Patent Laid-Open No. 2003-316458). In Japanese Patent Laid-Open No. 2003-316458, an actual cost is calculated as follows. (1) A server manages a correspondence table of user IDs and account IDs of authorized accounting destinations, and accounting information for each accounting account. Clients and peripheral devices can add, delete, and update a management table and accounting information.

(2) Prior to printing, the client requests the server to issue a job ticket indicating authorization of printing. A job ticket issuance request includes the user ID and account ID of an accounting destination.

(3) The server which received the job ticket issuance request looks up the correspondence table to check whether or not to authorize accounting for an account of the accounting destination. If accounting is authorized, the server issues a job ticket to the client.

(4) The client transmits the job ticket issued by the server to a peripheral device.

(5) The peripheral device confirms if the job ticket is an authentic one issued by the server. If the job ticket is an authentic one, the peripheral device executes printing, and charges to the account ID described in the job ticket.

However, in the aforementioned related art, the server which manages the account IDs of accounting destinations and the correspondence table, and issues a job ticket to each client need be installed. In order to install and maintain the server, labor for management and electricity and seat costs are required.

The account IDs and correspondence table managed by the server require maintenance and repair according to addition, deletion, or the like of accounting destinations, thus requiring labor for maintenance.

SUMMARY OF THE INVENTION

The present invention has been made in consideration of the aforementioned related art, and has as its object to obviate the need for installation of a server and to reduce maintenance cost required for accounting management of print jobs by facilitating management of accounting destinations.

In order to achieve the above object, the present invention comprises the following arrangement. That is, there is provided a printing apparatus connected to a network, comprising:

a storage configured to store an identifier list in which identifiers of layers for identifying accounting destinations to be charged for job execution are registered associated with the layers, respectively;

an obtaining unit configured to obtain an identifier list from an external apparatus via the network;

an updating unit configured to update the stored identifier list stored in the storage based on the obtained identifier list obtained by the obtaining unit in accordance with an update rule; and a display configured to display a setting screen for setting the update rule designating a layer whose identifier is used to update the stored identifier list when the stored identifier list is updated, wherein the updating unit updates the stored identifier list using the identifier contained in the obtained identifier list, the identifier used to update the obtained identifier list being designated by the update rule set in the setting screen displayed by the display.

In order to achieve the above object, the present invention further comprises the following arrangement. That is, there is provided a method for controlling a printing apparatus comprising a storage for storing an identifier list in which identifiers of layers for identifying accounting destinations to be charged for job execution are registered associated with the layers, respectively, and connected to a network, the method comprising:

an obtaining step of obtaining an identifier list from an external apparatus via the network;

an updating step of updating the stored identifier list stored in the storing step based on the obtained identifier list obtained in the obtaining step in accordance with an update rule; and a displaying step of displaying a setting screen for setting the update rule designating a layer whose identifier is used to update the stored identifier list when the stored identifier list is updated, wherein, in the updating step, the stored identifier list is updated using the identifier contained in the obtained identifier list, the identifier used to update the obtained identifier list being designated by the update rule set in the setting screen displayed in the displaying step.

In order to achieve the above object, the present invention further comprises the following arrangement. That is, there is provided a computer readable medium storing a computer program that causes a computer to perform a method for controlling a printing apparatus comprising a storage for storing an identifier list in which identifiers of layers for identifying accounting destinations to be charged for job execution are registered associated with the layers, respectively, and connected to a network, the method comprising:

an obtaining step of obtaining an identifier list from an external apparatus via the network;

an updating step of updating the stored identifier list stored in the storing step based on the obtained identifier list obtained in the obtaining step in accordance with an update rule; and a displaying step of displaying a setting screen for setting the update rule designating a layer whose identifier is used to update the stored identifier list when the stored identifier list is updated, wherein, in the updating step, the stored identifier list is updated using the identifier contained in the obtained identifier list, the identifier used to update the obtained identifier list being designated by the update rule set in the setting screen displayed in the displaying step.

According to the present invention, cost required for installation and maintenance of an accounting management system can be reduced, and convenience can be improved.

Further features of the present invention will become apparent from the following description of exemplary embodiments with reference to the attached drawings.

BRIEF DESCRIPTION OF THE DRAWINGS

FIG. 8 shows an example of a print job history according to the present invention;

FIG. 9 shows an example of an identifier list according to the present invention;

FIG. 11 shows an example of transmission data used to issue an addition request of an identifier according to the present invention;

DESCRIPTION OF THE EMBODIMENTS

<First Embodiment>

System Arrangement

Figure 1:
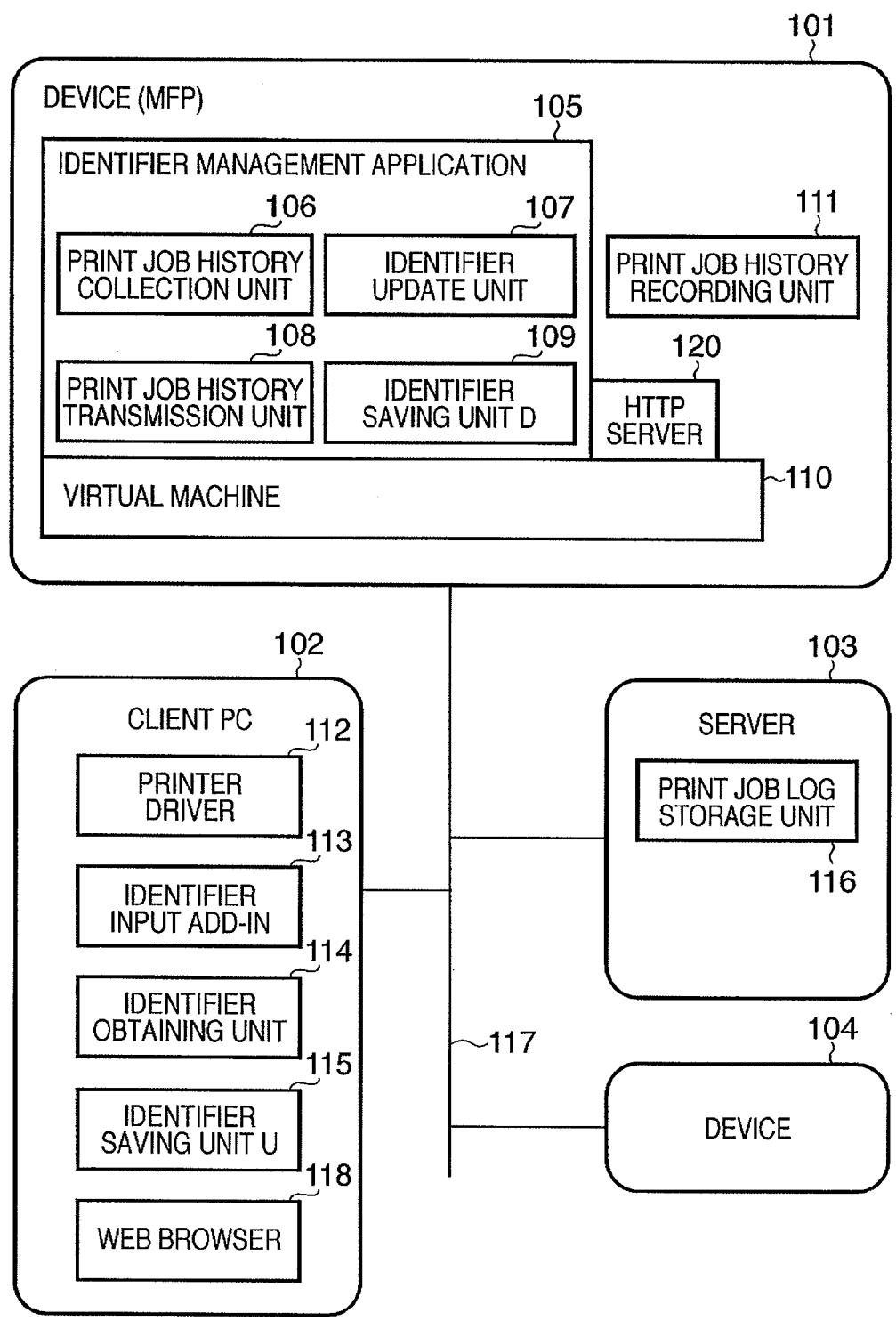
FIG. 1 is a block diagram showing the overall logical arrangement of the present invention.

One embodiment of the present invention will be described hereinafter with reference to the accompanying drawings. Referring to FIG. 1, a device 101 is a peripheral device including a printing apparatus such as a printer, MFP, or the like. A client PC 102 is also called a client terminal, and is a computer with which the user makes various operations, printing, and the like. A server 103 is a computer which stores a variety of data. A device 104 is also a peripheral device such as a printer, MFP, or the like. These devices are connected to each other via a network 117.

A server 103 manages users of the network system, and groups to which the users belong. The server 103 saves a user-device table which associates devices, the use authorities of which are granted to respective users or groups, with user names or group names. The user-device table is transmitted to a device as a request source in response to a request from the device. When the user executes printing at the client PC 102, the client PC 102 requests the server 103 to issue a print authorization ticket. If the request source client has an authority, the server 103 issues the print authorization ticket to the client PC 102. The client PC 102 issues a print job to a device (e.g., a printer) together with this print authorization ticket. The device which received the print job refers to the print authorization ticket. If the user as the issuer of the print job is an authorized user, the device executes the print job to perform printing and the like. In this embodiment, no more explanation about authentication of the user authority will not be given.

At the client PC 102, the user executes an application program (to be simply referred to as an application hereinafter), and instructs to print application data as needed. Upon issuing a print instruction, the application issues a rendering instruction to an API (Application Programming Interface) provided by an OS (Operating System). The OS calls a printer driver 112 according to the issued rendering instruction.

Assume that the printer driver 112 can add a software module (to be simply referred to as add-in hereinafter) which provides a new function to original basic functions using a function called add-in. In this case, an identifier input add-in 113 is added. The identifier input add-in 113 is called from the printer driver 112 at the beginning of printing, e.g., when the printer driver 112 receives the rendering instruction from the OS. The identifier input add-in 113 communicates with the device 101 and acquires a list of identifiers saved in the device 101. The identifier input add-in 113 displays an identifier specifying dialog. The user can specify a desired identifier via the identifier specifying dialog. In this embodiment, identifiers are classified into three layers, and the user can specify an identifier which belongs to each layer. Furthermore, the user can add or edit identifiers saved in the device 101 via the identifier specifying dialog. Details will be described later.

Figure 7:
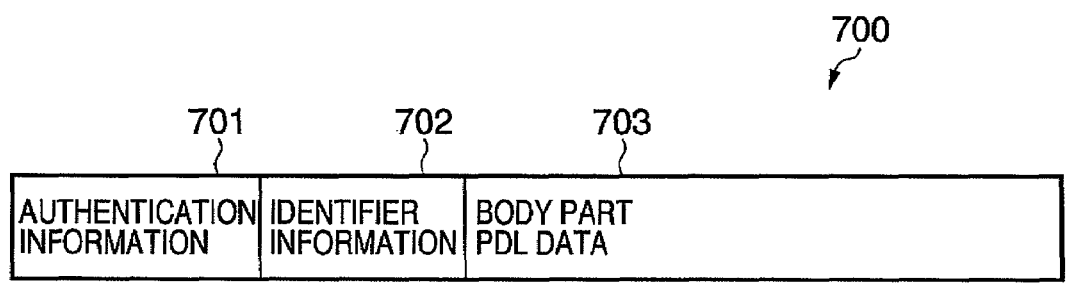
FIG. 7 shows an example of print job data according to the present invention.

The identifier input add-in 113 notifies the printer driver 112 of the identifier specified by the user. The printer driver 112 embeds the received identifier in print job data as an entity of a print job which has began to be generated upon calling the identifier input add-in 113. FIG. 7 shows an example of print job data. Referring to FIG. 7, print job data 700 includes authentication information 701, identifier information 702, and a body part 703. The authentication information 701 is used to authenticate the authenticity of the print job in the device 101 as a transmission destination of the print job. The identifier information 702 is an identifier which is passed from the identifier input add-in 113 and is embedded. The body part 703 is data which represents an image to be printed by the device 101, and is, for example, PDL data or bitmap data. In the example of FIG. 7, the body part 703 stores PDL data. The client PC 102 is also installed with an application program (not shown), Web browser 116, and the like.

Upon reception of the print job data, the device 101 executes the print job, and records its history information in a print job history recording unit 111. FIG. 8 shows an example of history information of a print job (to be referred to as a job history or log hereinafter). The job history shown in FIG. 8 saves identifiers 801 to 803 in correspondence with a job ID of the print job in addition to print setting information such as the start and end times, user name, document name, paper size, and the like of the print job. The identifier 801 is unique to, e.g., a customer (client) as an accounting destination of the print job. The identifier 802 indicates, e.g., the contents (matter) or the like of the print job. The identifier 803 indicates contents (sub matter) or the like formed by segmenting the contents indicated by the identifier 803. In this way, the identifiers are hierarchized (into three layers in this embodiment). A target indicated by these identifiers, e.g., a customer is charged for the print job.

On the device 101, a virtual machine 110 is running, and an identifier management application 105 is further running on the virtual machine 110. Other applications can be added onto the virtual machine 110, and applications on the virtual machine 110 can be deleted. As an example of the virtual machine, JavaVM™ of SUN MICROSYSTEMS, U.S.A., is known.

The identifier management application 105 includes a print job history collection unit 106, identifier update unit 107, print job history transmission unit 108, and identifier saving unit D 109. The print job history collection unit 106 monitors completion of a print job. Upon completion of the print job, the unit 106 obtains and saves a print job history from the print job history recording unit 111. The print job history transmission unit 108 transmits print job histories collected by the print job history collection unit 106 to the server 103 based on settings by a system administrator. Note that the server 103 is a simple file server, and does not manage identifiers appended to print jobs. Focusing only on the present invention, either the print job history recording unit 111 or the print job history collection unit 106 may save print job histories.

The identifier update unit 107 periodically updates a list of identifiers (to be referred to as an identifier list hereinafter) based on the settings of the system administrator, and saves the updated identifier list in the identifier saving unit D 109 after updating. The update processing will be described later. Also, a synchronization setting or the like required to synchronize the identifier list with other devices is saved in the identifier saving unit D 109. The identifier saving unit D 109 also saves, for example, a cooperation device list required to specify devices as targets with which the identifier list is synchronized, update rules of the specified cooperation device list, and the like. That is, the identifier saving unit D 109 also includes a device saving unit for saving the cooperation device list, and an update rule saving unit for saving the update rules.

The device 101, client PC 102, server 103, and device 104 are connected to the network and can communicate with each other. As a scheme for communications, for example, SOAP (Simple Object Access Protocol) is known. The SOAP is an information exchange protocol in a distributed environment. The SOAP uses XML (eXtensible Markup Language) for information description, and TCP/IP and HTTP for transmission.

In the device 101, an HTTP server 120 used for identifier settings to be described later (different from maintenance of identifiers) is implemented. The device 101 further comprises saving means for saving pages (not shown) associated with URLs.

The device 101 comprises the print job history recording unit 111. The print job history recording unit 111 allows execution of processing that refers to job histories even when the identifier management application 105 is not installed. For example, a job history referred to from a remote UI can be made without the intervention of the identifier management application 105. Note that the remote UI is a device management Web server which makes device management using an HTTP server installed in an MFP (e.g., the MFP 101). The print job history recording unit 111 allows the client PC to display a device management page (i.e., a print job history) by connecting the device 101 from the Web browser 118 of the client PC.

Figure 2:
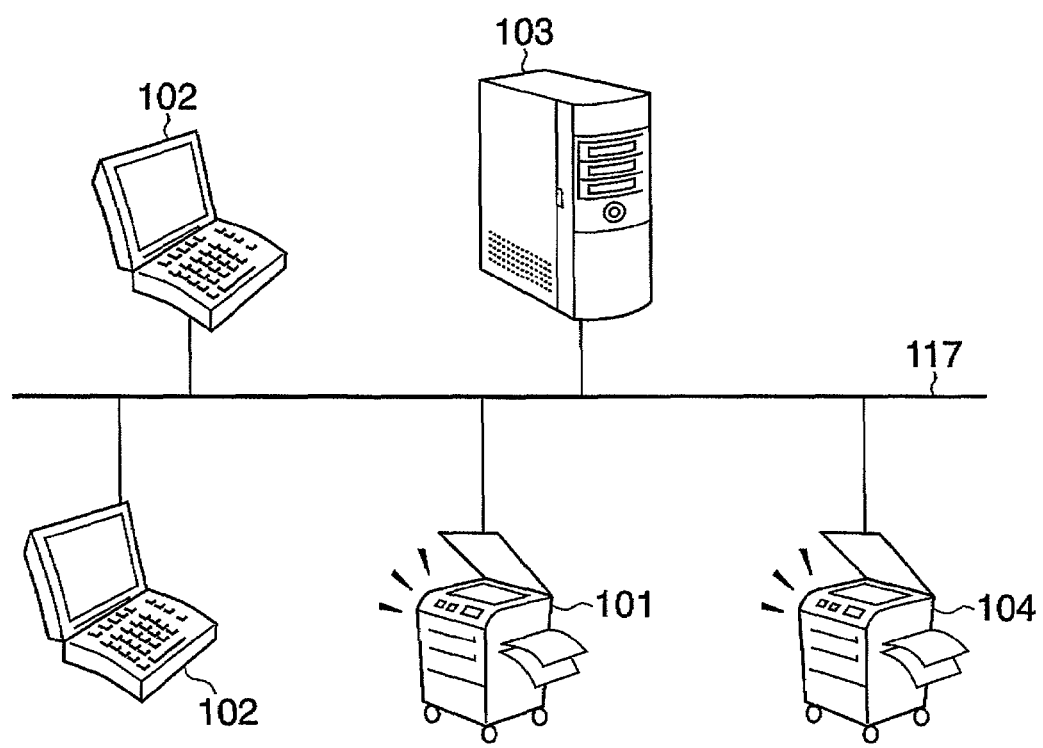
FIG. 2 is a view showing an example of a layout of respective functional components of a system shown in FIG. 1.

FIG. 2 shows an example of a layout of functional components in the system described using FIG. 1. Referring to FIG. 2, the printer driver 112 and identifier input add-in 113 in FIG. 1 are executed on the client PC 102. A server PC 103 is the same as the server 103 in FIG. 1. A copying machines 101 and 104 corresponds to the device 101 or 104 in FIG. 1.

The client PC 102, server 103, and copying machine 101 are connected to each other via the LAN 117, and exchange information via the LAN 117. The aforementioned configuration is merely an example of the system, and a result collection client and printer driver other than the MFP in FIG. 1 may all be implemented by a client computer or by some server computers. That is, an interface between the components in FIG. 1 may be a physical communication medium such as a CPU bus or the like or a logical interface for a message communication, which is implemented by software. The aforementioned functional blocks may be implemented when a CPU executes programs, or may be implemented by hardware circuits.

Figure 3:
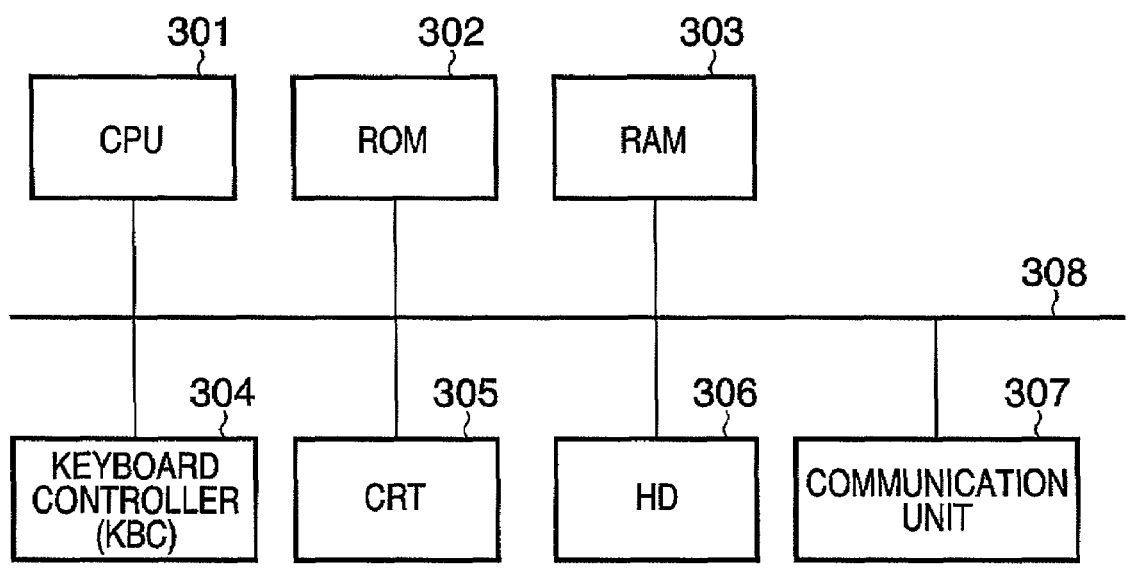
FIG. 3 is a block diagram showing an example of the internal arrangement of a PC according to the present invention.

FIG. 3 is a block diagram of a computer used as the client PC 102, server 103, and the like in FIG. 1. Referring to FIG. 3, a CPU 301 is a central processing unit, which controls the overall computer and makes arithmetic processing and the like. A ROM 302 is a read-only memory, which is a storage area of information of a system startup program and the like. A RAM 303 is a random access memory, which is a data storage area without any use limitations. An operating system, applications, device drivers, programs for, e.g., communication control, and the like are loaded onto the RAM 303, and are executed by the CPU 301. A KBC 304 is a keyboard controller, which receives input data from a keyboard and transfers them to the CPU 301. A CRT 305 includes a display controller and display device, and the display controller makes display control on the display device. An HD 306 is an HD, i.e., a hard disk drive, which stores program files and data files. A nonvolatile semiconductor storage device may be used as an external storage device in place of the HD. The programs and data stored in the HD 306 are referred to as needed at the time of execution, and are loaded onto the RAM 303. A communication unit 307 executes network communication control. The communication unit 307 allows to communicate with other computers and peripheral devices connected to the network, as described above using FIG. 1. A system bus 308 serves as a data path among the aforementioned components.

Figure 4:
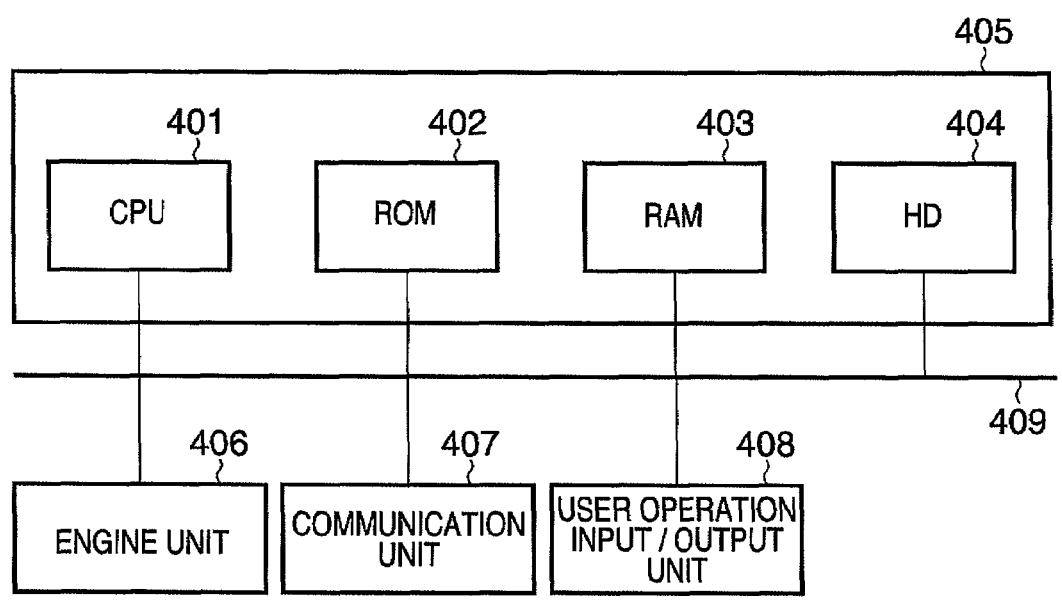
FIG. 4 is a block diagram showing an example of the internal arrangement of a copying machine according to the present invention.

FIG. 4 is a block diagram of the device, i.e., the MFPs 101 and 104. Referring to FIG. 4, a controller 405 controls the overall device. In the controller, a CPU 401, i.e., a central processing unit controls the controller and executes arithmetic processing and the like. A ROM 402 is a read-only memory, which is a storage area of information of a system startup program and the like. A RAM 403 is a random access memory, which is a data storage area without any use limitations. An HD 404 is a nonvolatile storage device such as a hard disk or the like; A nonvolatile semiconductor memory can replace the HD 404.

An operating system, programs for communication control and engine control, and the like are loaded onto the RAM 403, and are executed by the CPU 401. An engine unit 406 executes a print operation and image scanning operation under the control of the controller. A communication unit 407 executes network communication control, and allows communications with the client PC 102 and server 103 described above using FIG. 1. A user operation input/output unit 408 provides a user interface for interactive setting operations to the user. A system bus 409 serves as a data path among the aforementioned components.

<Configuration for Print Job Execution by Device (MFP)>

Figure 5:
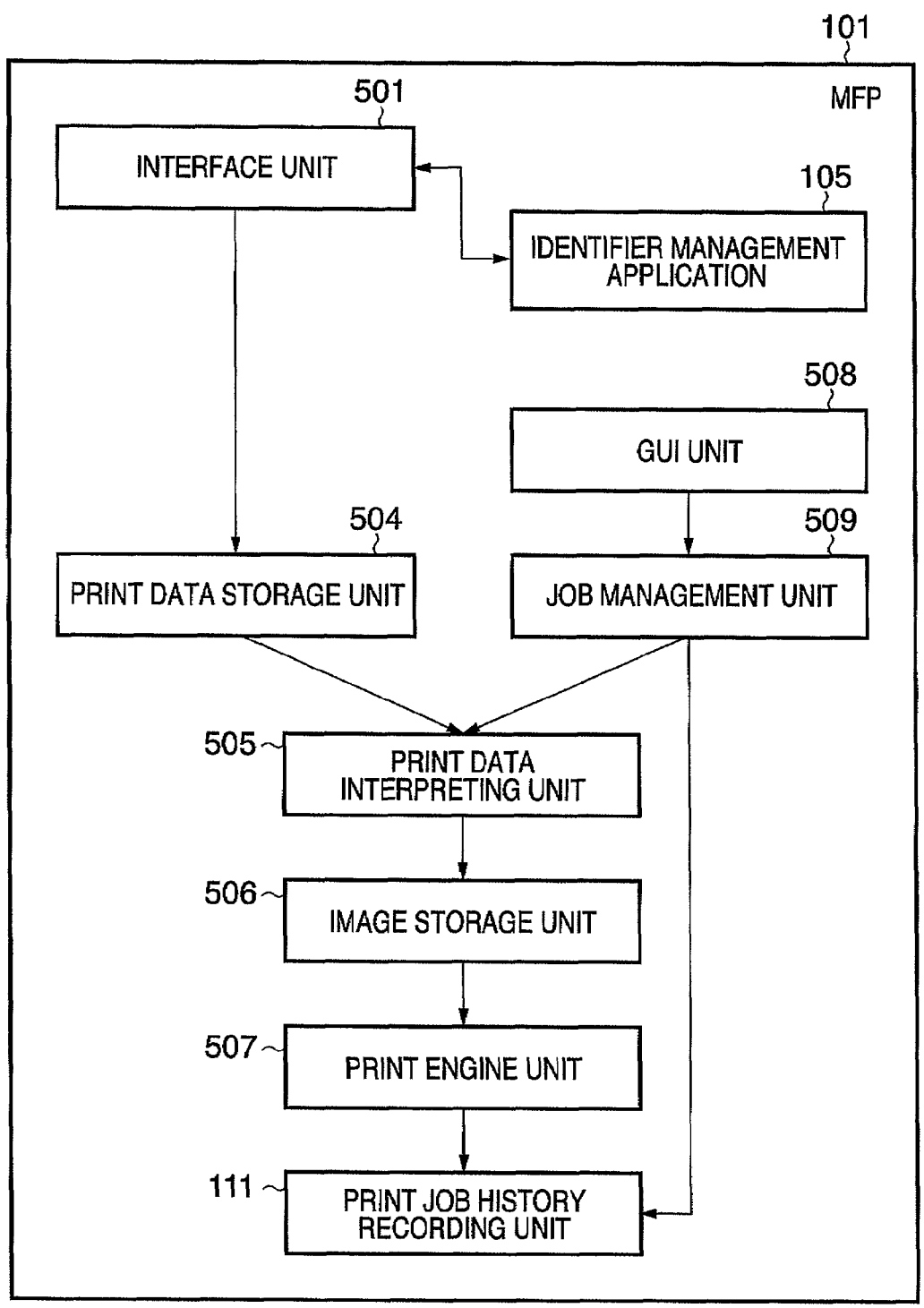
FIG. 5 is a block diagram showing an example of the internal arrangement of the copying machine according to the present invention.

FIG. 5 shows the configuration of the device 101, i.e., the MFP. FIG. 5 especially shows the configuration for executing a print job by means of software and hardware. Referring to FIG. 5, an interface unit 501 receives print job data from the client PC 102. A GUI (Graphical User Interface) unit 508 provides a UI for setting and displaying device operations by the user. A print data storage unit 504 temporarily stores print data included in the print job data, i.e., PDL (Page Description Language) data. A print job management unit 509 temporarily stores attribute information (or print settings) such as the user name, role, the number of logical pages, page layout information, the number of sheets to be printed, monochrome/color designation, and the like of the print job. A print data interpreting unit 505 obtains the PDL data from the print data storage unit 504 and generates image data in accordance with the attribute information stored in the print job management unit 509. An image storage unit 506 temporarily stores the image data generated by the print data interpreting unit 505 until printing is completed.

A print engine unit 507 actually prints the image data stored in the image storage unit 506 on a medium such as a print sheet or the like using a known print technique such as an electrophotography technique, ink-jet technique, or the like. The print data interpreting unit 505, image storage unit 506, and print engine unit 507 serve as a print execution unit that executes the print job.

Upon completion of execution of the print job, the print job history recording unit 111 records attributes of the print job such as the user name, document name, and the like stored in the print job management unit 509 as an execution history of the print job (i.e., a print job history) in a nonvolatile recording medium as history saving means. The print job history also includes print results such as the number of pages, the number of sheets, color mode, and the like printed by the print engine unit 507. The identifier management application 105 exchanges information associated with maintenance management of identifiers with the client PC 102.

<Specify and Edit Identifiers>

Figure 6:
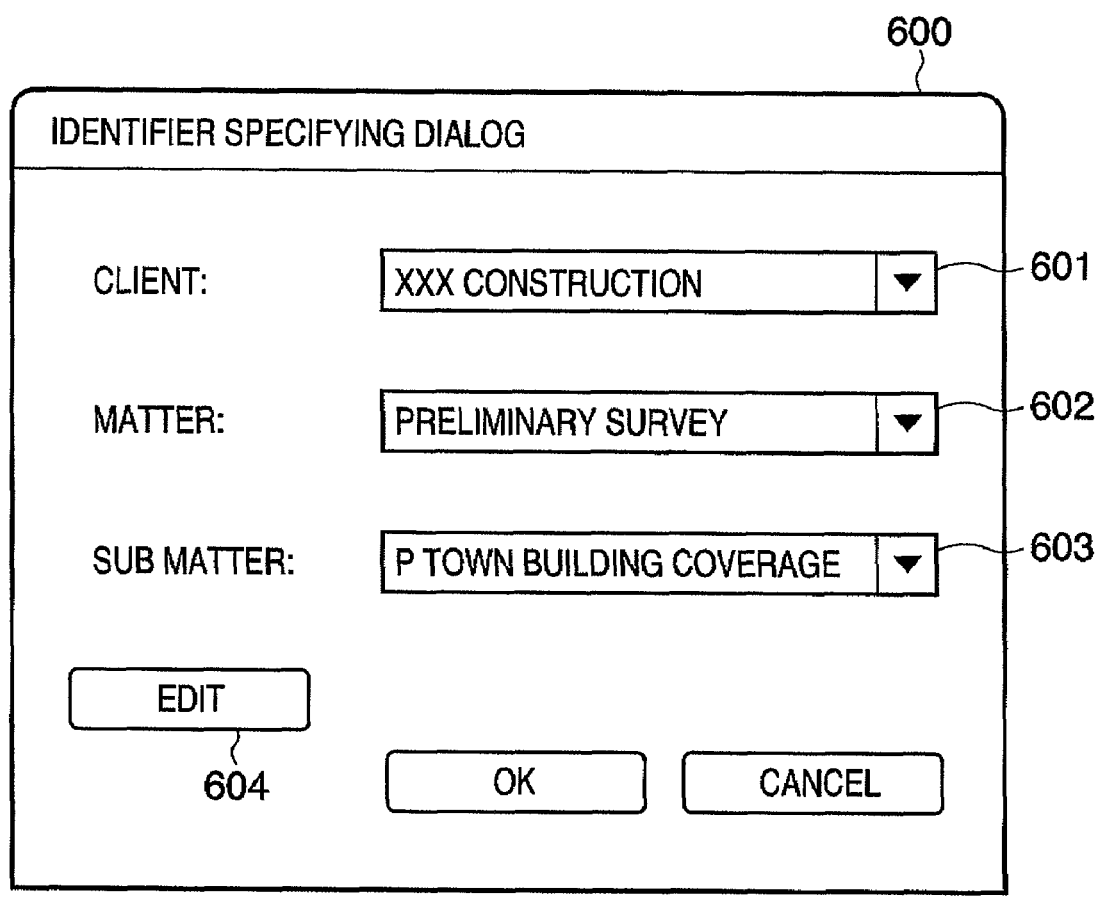
FIG. 6 shows an example of a dialog used to specify an identifier according to the present invention.

The sequence for selecting identifiers by the user in the aforementioned configuration will be described below. FIG. 6 shows an example of an identifier specifying dialog displayed by the identifier input add-in 113 so as to make the user select identifiers to be appended to the print job. For example, this dialog is displayed when an identifier specifying button is added to a UI of the printer driver as a result of addition of the identifier input add-in 113 and the user presses that button.

On a window 600 shown in FIG. 6, the user can specify identifiers classified into three layers in respective layers. Layer names are respectively "client", "matter", and "sub matter". The user selects a desired identifier from each of list boxes 601 to 603 corresponding to the respective layers, and presses an OK button upon completion of selection. The identifiers of the respective layers selected at that time are specified identifiers. The specified identifiers are appended to print jobs to be executed later until the identifiers to be specified are changed.

Figure 10:
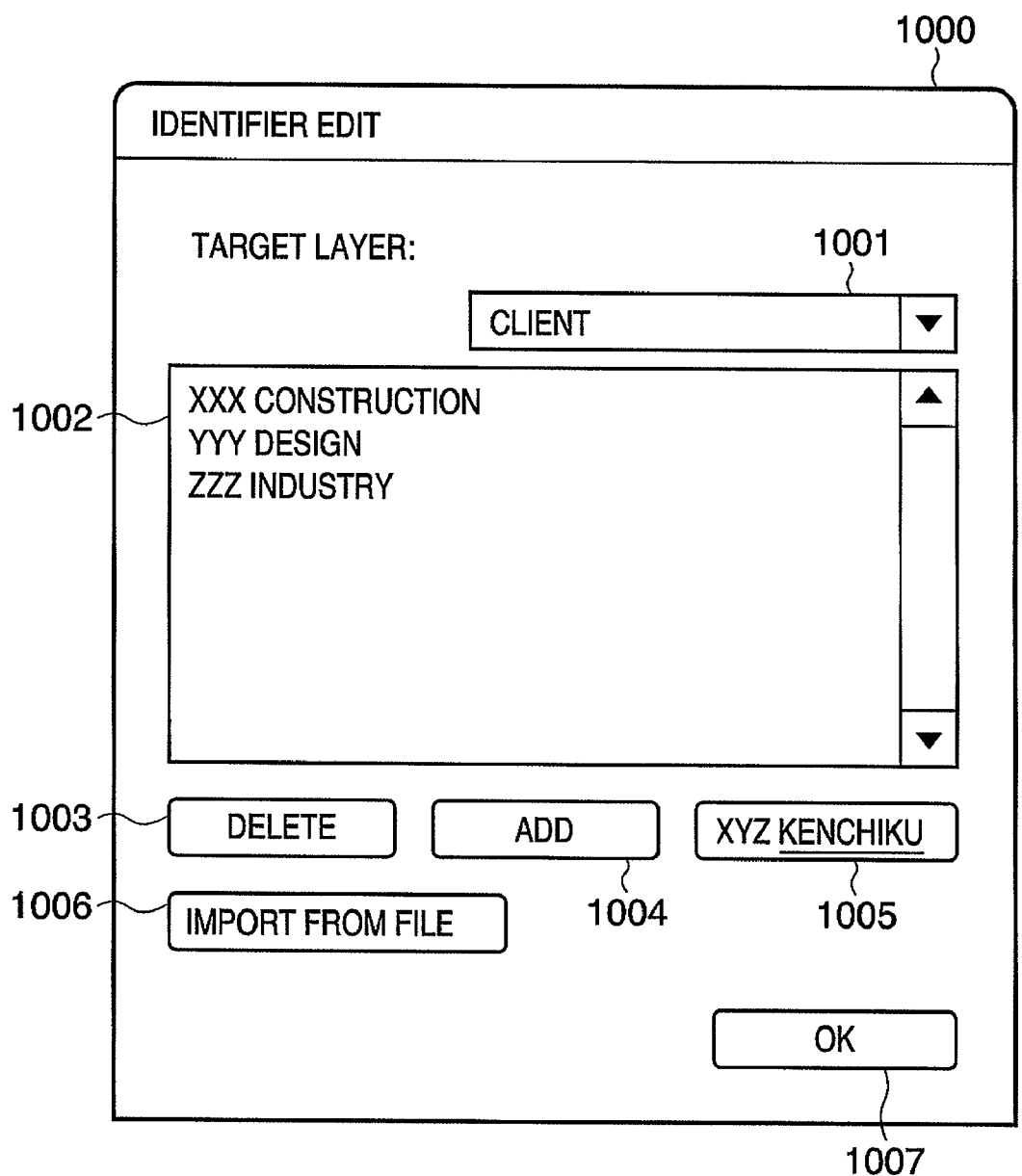
FIG. 10 shows an example of a dialog window used to edit identifiers according to the present invention.

Upon pressing an edit button 604, the identifier input add-in 113 shows an identifier edit dialog 1000 shown in FIG. 10.

An identifier obtaining unit 114 communicates with the device 101 to obtain the identifier list saved in the identifier saving unit D 109. The obtained identifier list is saved in an identifier saving unit U 115. FIG. 9 shows an example of the identifier list.

Each identifier information included in an identifier list 901 includes a layer name indicating one of the three layers, and an identifier. Furthermore, the identifier information is associated with the name of a user who added or generated the identifier, and a group name to which the user belongs. The identifier and items associated with the identifier in the identifier list will often be referred to as an identifier record hereinafter.

Display rules for determining which identifiers included in the identifier list are to be displayed as options on the identifier specifying dialog 600 are obtained from the identifier saving unit D 109. For example, examples of the display rules are: (1) all identifiers saved in the identifier list 901 are displayed; (2) identifiers associated with a group which matches that of the operating user of those saved in the identifier list 901 are displayed; and (3) identifiers associated with the user name which matches the operating user of those saved in the identifier list 901 are displayed. Also, other rules are available. the user can select desired identifiers for respective layers from those which are displayed according to one of these rules.

The system administrator can determine the number of layers of identifiers, the names of the layers, components of each layers, and display rules. This will be described later.

The identifier edit dialog shown in FIG. 10 will be described below. The user can select a layer to be edited from a layer selection list box 1001. An identifier list field 1002 displays identifiers registered in the selected layer in the form of a list. Upon pressing a delete button 1003 while a given identifier is selected, the client PC 102 communicates with the device 101 and transmits a delete request message of the identifier selected on the identifier list field 1002. Upon reception of the delete request, the device 101 deletes the corresponding identifier from the identifier saving unit D 109, and returns a processing completion message. Deletion targets at not only the identifier but also a record of that identifier. That is, the layer name, group name, and user name associated with the identifier are also deleted. Of course, if the identifier list includes other items associated with the identifier, these items are also deleted. This processing will be simply referred to as deletion of an identifier hereinafter. Upon completion of deletion, the device 101 transmits a processing completion message to the identifier input add-in 113. Upon reception of the processing completion message, the identifier input add-in 113 deletes that identifier from the identifier saving unit U 115 of the client PC 102, and updates display on the identifier list field 1002 accordingly.

Upon pressing an add button 1004 on the dialog 1000, the identifier input add-in 113 executes processing for adding a character string input to a new identifier text box 1005 as an identifier to the identifier list. The identifier input add-in 113 communicates with the device 101 and transmits an add request message of the input identifier. FIG. 11 shows an example of the add request message. As shown in FIG. 11, the add request includes a layer name 1101, an identifier 1102, a name 1103 of an added user, and a group name 1104 to which the user belongs. The add request message shown in FIG. 11 has an XML format. A tag "Insert" indicates an add request. A tag "name" indicates an identifier to be added. A tag "UserName" indicates the user name who added the identifier. A tag "GroupName" indicates a group to which the user who added the identifier belongs. Although not described in detail here, the users and groups are managed using a function provided by the OS.

Upon reception of the add request message, the device 101 additionally saves the identifier received at the same time in the identifier saving unit D 109. Then, the device 101 returns a processing completion message. Upon reception of the processing completion message, the identifier input add-in 113 adds the identifier to the identifier saving unit U 115 of the client PC 102, and updates display of the identifier list accordingly.

Upon pressing an import button 1006 on the dialog 1000, the identifier input add-in 113 displays a dialog used to specify a file. Identifiers described in the file specified on the dialog can be added to the identifier list. The processing in this case is the same as that upon pressing the aforementioned add button. Note that the addition processing is repeated for all identifiers included in the specified file. Upon pressing an OK button 1007, the dialog closes.

<Edit Identifier Setting>

Figure 12:
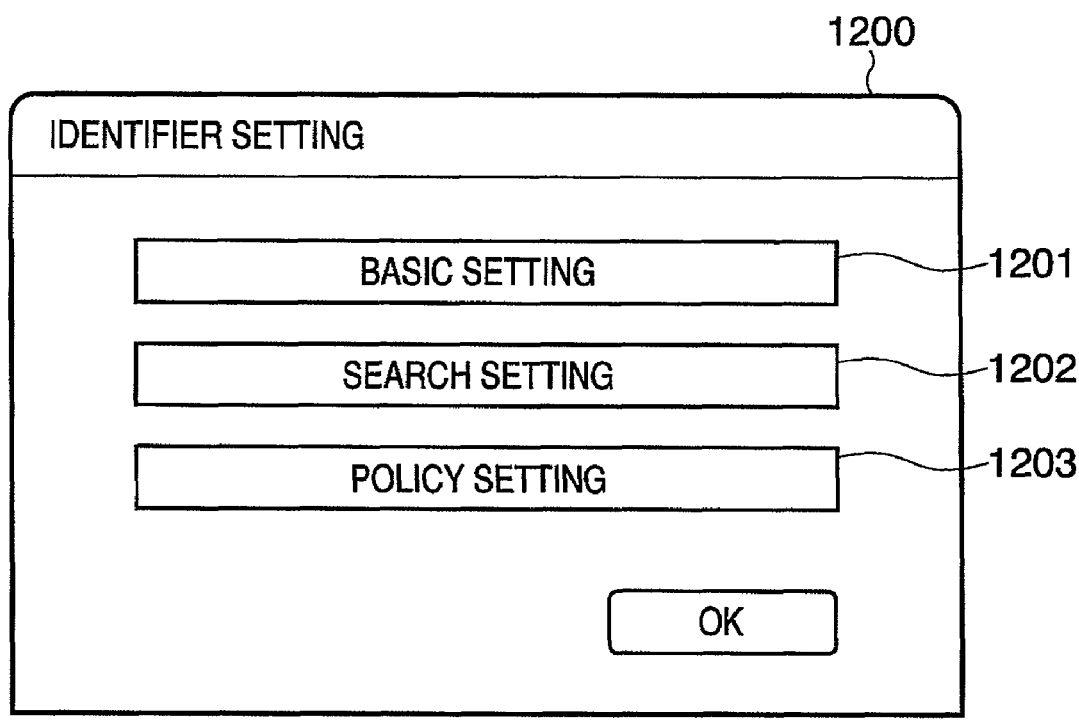
FIG. 12 shows an example of a dialog used to make identifier settings according to the present invention.

FIG. 12 shows an example of an identifier setting dialog window. The identifier setting is not a function of maintaining an identifier itself. The system administrator communicates with the device 101 to make various settings associated with an identifier via this identifier setting dialog. The device 101 comprises the HTTP server 120, and can interactively communicate with the system administrator who operates the client PC.

The system administrator specifies a URL of the identifier setting dialog provided by the HTTP server 120 of the device 101 using the Web browser 118. In response to this operation, the HTTP server 120 returns data of the specified page to the client PC 102. The Web browser 118 displays that page, i.e., an identifier setting dialog 1200.

The identifier setting dialog 1200 comprises three buttons, i.e., a basic setting button 1201, search setting button 1202, and collaboration setting button 1203. Upon pressing one of these buttons, a URL associated with the pressed button is transmitted to the device 101, and a returned dialog for a setting corresponding to the pressed button is displayed.

Figure 13:
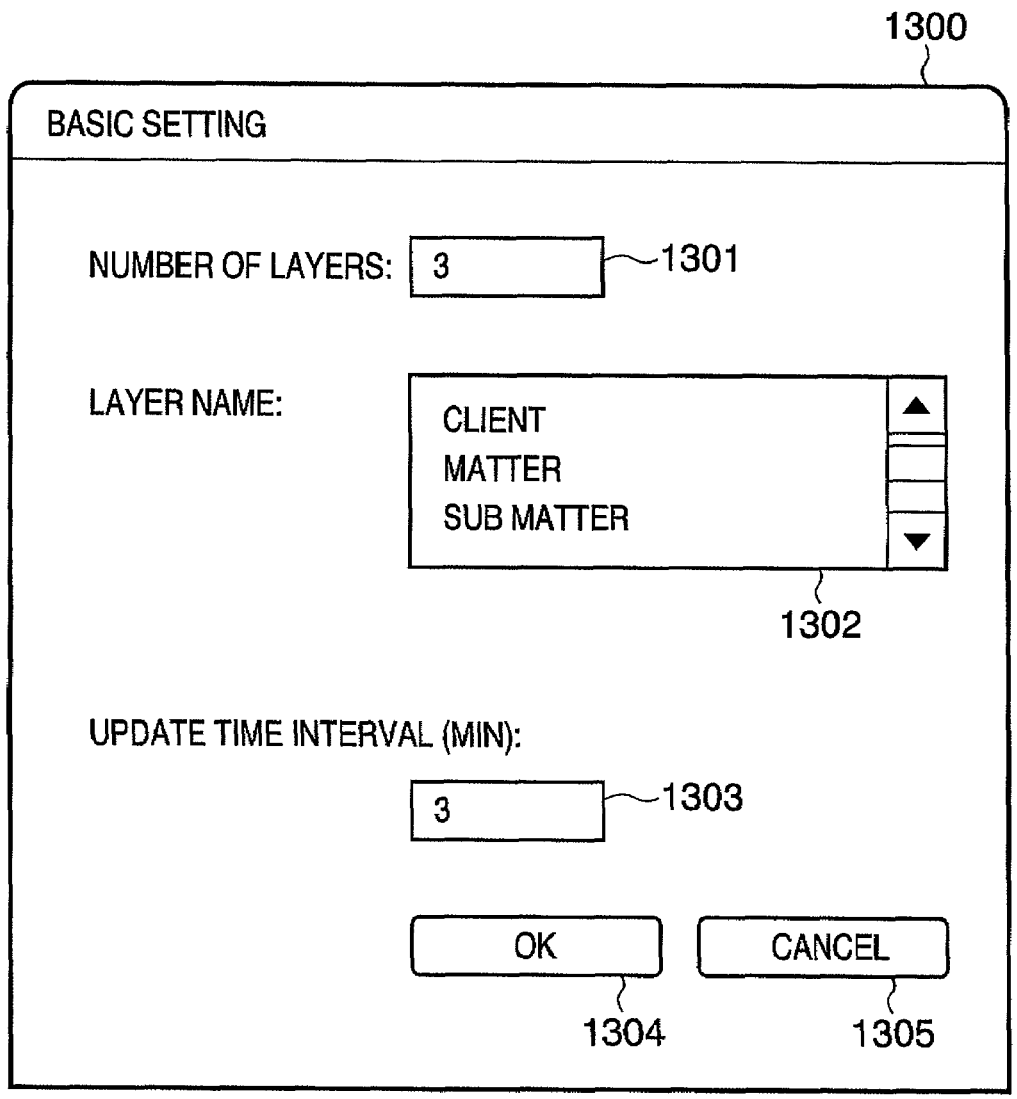
FIG. 13 shows an example of a dialog used to make an identifier basic setting according to the present invention.

FIG. 13 shows a basic setting dialog 1300 displayed upon pressing the basic setting button 1201. A text box 1301 in FIG. 13 is used to specify the number of layers. A list box 1302 is used to specify the names of the respective layers, and the number of elements in a list is the same as the number of layers specified in the text box 1301. A text box 1303 is used to determine an update time interval. Upon pressing an OK button 1304, basic setting information indicating the aforementioned setting contents is transmitted to the device 101, and the dialog is closed. Upon pressing a cancel button 1305, the processing is aborted, and the dialog is closed. The basic setting transmitted to the device 101 is saved in the identifier saving unit D 109 of the device 101.

Figure 15:
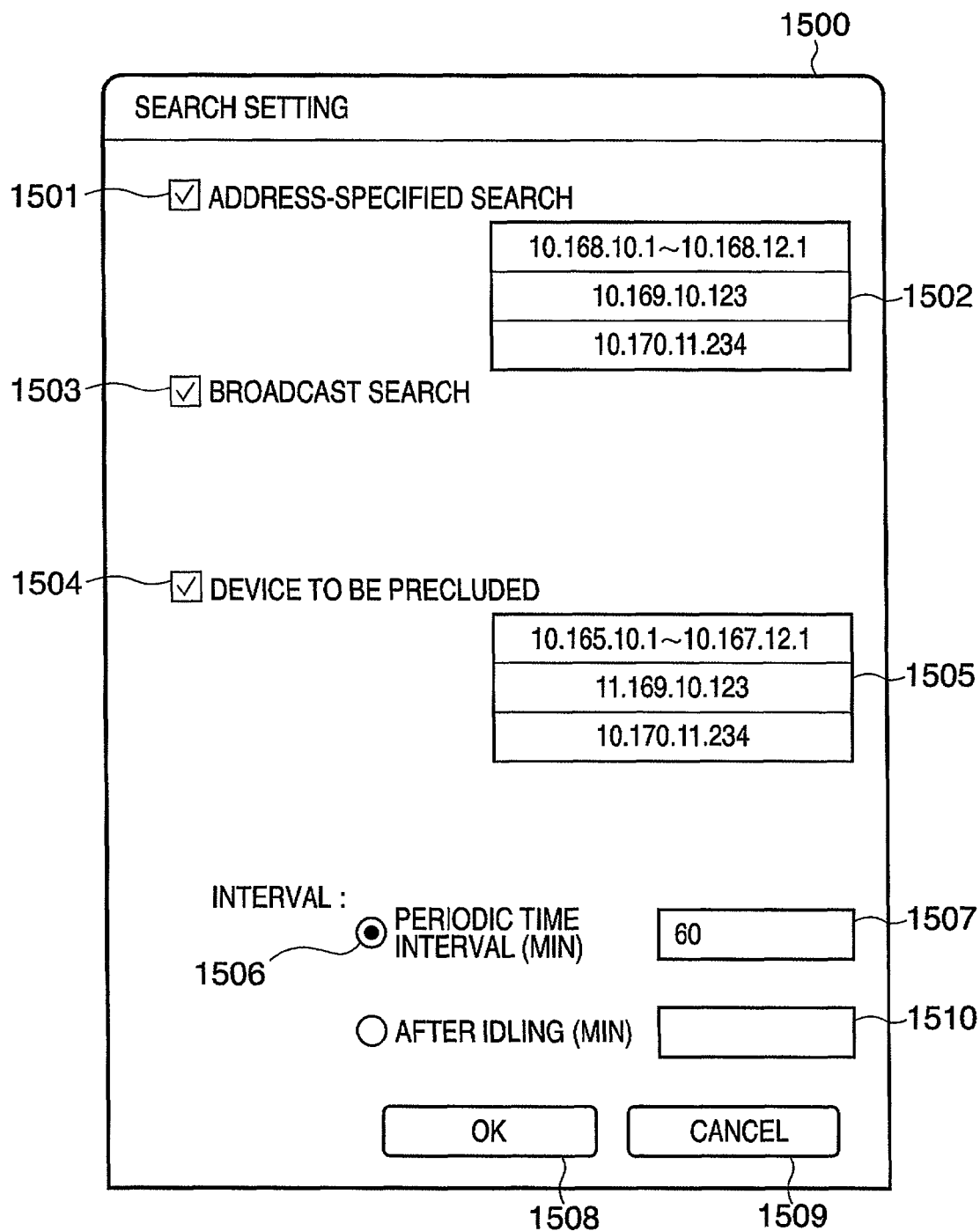
FIG. 15 shows an example of a dialog used to make a search setting according to the present invention.

FIG. 15 shows a search setting dialog 1500 displayed when the user presses the search setting button 1202. With the search setting dialog 1500, the user determines the conditions for creating a list of devices as cooperation partners (cooperation device list).

A check box 1501 is used to specify whether or not to conduct an address-specified search. A device which is set to conduct an address-specified search adds a device specified by an address-specified list 1502 to the cooperation device list.

A check box 1503 is used to specify whether or not to conduct a broadcast search. A device which is set to conduct a broadcast search sends a transmission packet to a broadcast address, and adds a device which returns a response to the cooperation device list.

A check box 1504 is used to specify a device to be precluded. A device specified as a device to be precluded does not include a device described in an address preclusion list 1505 in the cooperation device list. If such device is included in the cooperation device list, it is deleted.

A radio button 1506 is used to determine the update timing of the device list. When the user selects a "periodic time interval", a device search is conducted at a time interval specified in a text box 1507 to update the cooperation device list. When the user selects "after idling", and when an idle state in which there is no print job to be processed by devices continues for a time period or longer specified in a text box 1510, the cooperation device list is updated. The search setting information indicating the search settings specified on the user interface shown in FIG. 15 is transmitted to the device 101, and is saved in the identifier saving unit D 109.

Figure 16:
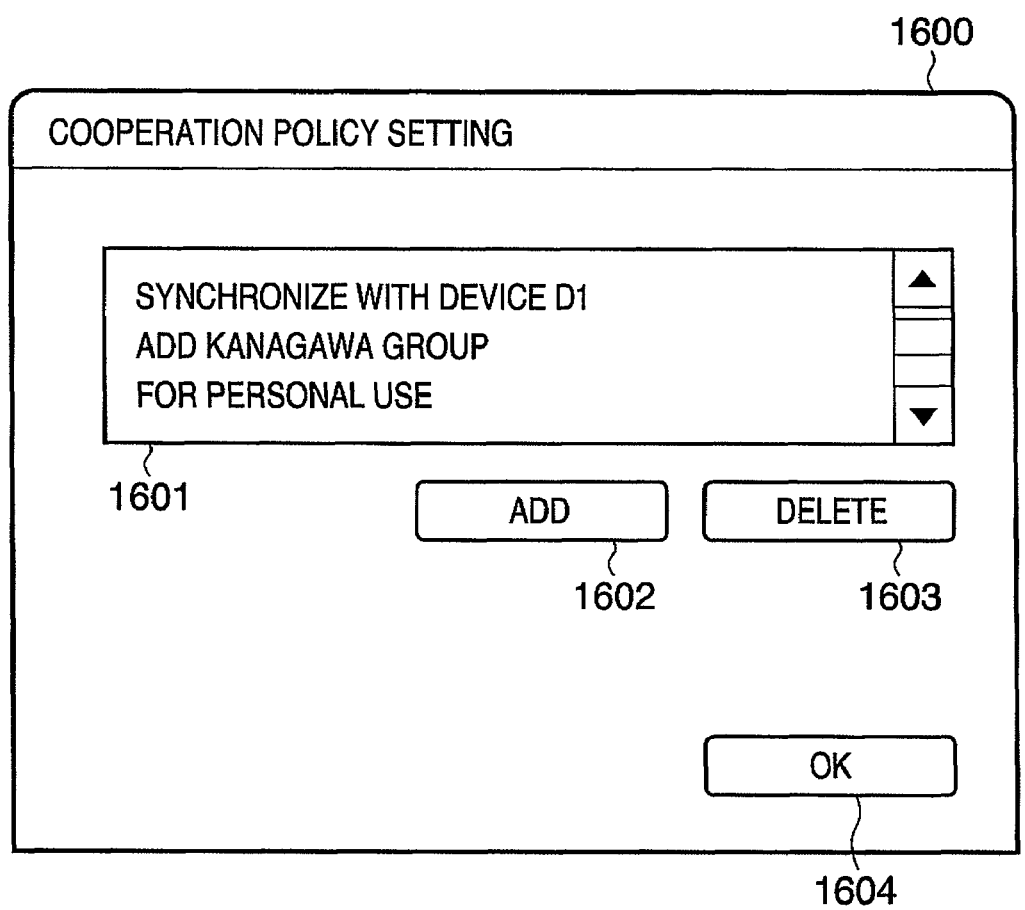
FIG. 16 shows an example of a dialog used to edit cooperation policies according to the present invention.

FIG. 16 shows a cooperation policy setting dialog 1600 displayed upon pressing the cooperation policy setting button 1203. With the cooperation policy setting dialog 1600, the user can add or delete cooperation policies. A policy list 1601 displays a list of policies to be applied. An add button 1602 is used to add a new policy. New addition processing will be described later. A delete button 1603 is used to delete a policy selected on the policy list 1601. The cooperation policies can also be update rule information indicating rules for updating the identifier list.

Figure 17:
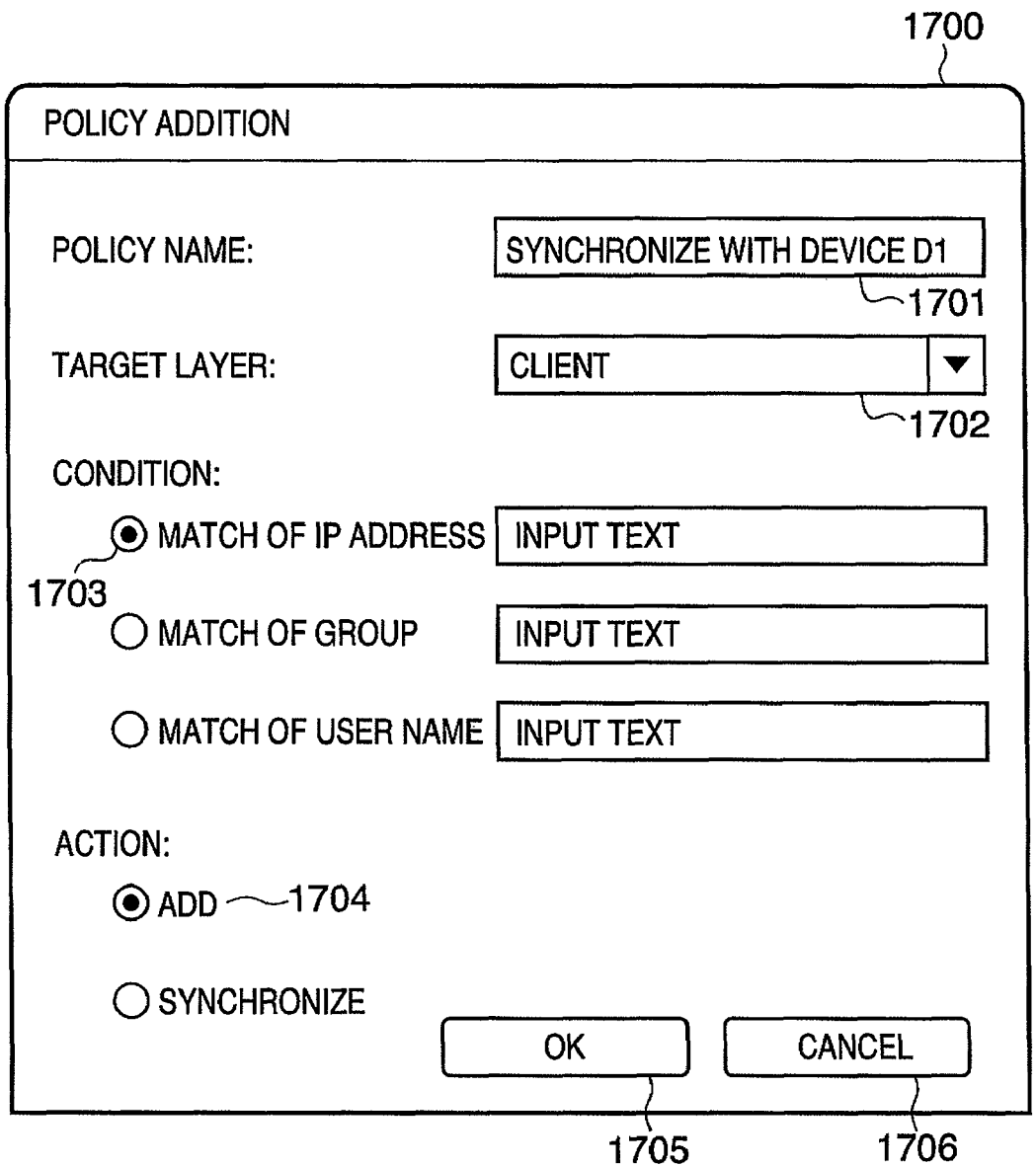
FIG. 17 shows an example of a dialog used to add a cooperation policy according to the present invention.

Upon pressing the add button 1602, a policy addition dialog 1700 shown in FIG. 17 is read out from the device and is displayed. A text box 1701 is used to specify the name of this policy. A list box 1702 is used to specify a target layer. Radio buttons 1703 are used to select a condition. When the user selects "match of IP address", a match between the IP address specified in the right text box with that of a target device is determined as a policy match condition. An IP address to be specified may be a part of an IP address. In this case, a partial match is checked. When the user selects "match of group", a match between a group associated with an identifier matches that specified by the condition is determined as a match condition. When the user selects "match of user", a match between a user associated with an identifier and that specified as a condition is determined as a match condition. Radio buttons 1704 are used to select whether an identifier is additionally or synchronously updated to the identifier list. In case of additional update, an identifier of the target device is inserted into the identifier list. In case of synchronous update, the identifier list of the self device is adjusted to the target device with reference to the identifier list of the target device. Upon pressing an OK button 1705, a policy is added based on the aforementioned settings. The added or changed policy is saved in the identifier saving unit D 109 as policy information. Upon pressing a cancel button 1706, the processing is canceled to close the dialog. The number of cooperation policies is not limited to one, but a plurality of pieces of different policy information may be used, as shown in the policy list of FIG. 16. Hence, policy information specified by one policy name will be referred to as one set of policy information hereinafter. FIG. 16 shows an example of three sets of policy information.

Note that a plurality of sets of policy information can be set in this example. However, if a plurality of sets of policy information are set for each layer, the settings become troublesome. Hence, it is desirable to set one set of policy information for each layer.

<Identifier Setting Information>

Figure 20:
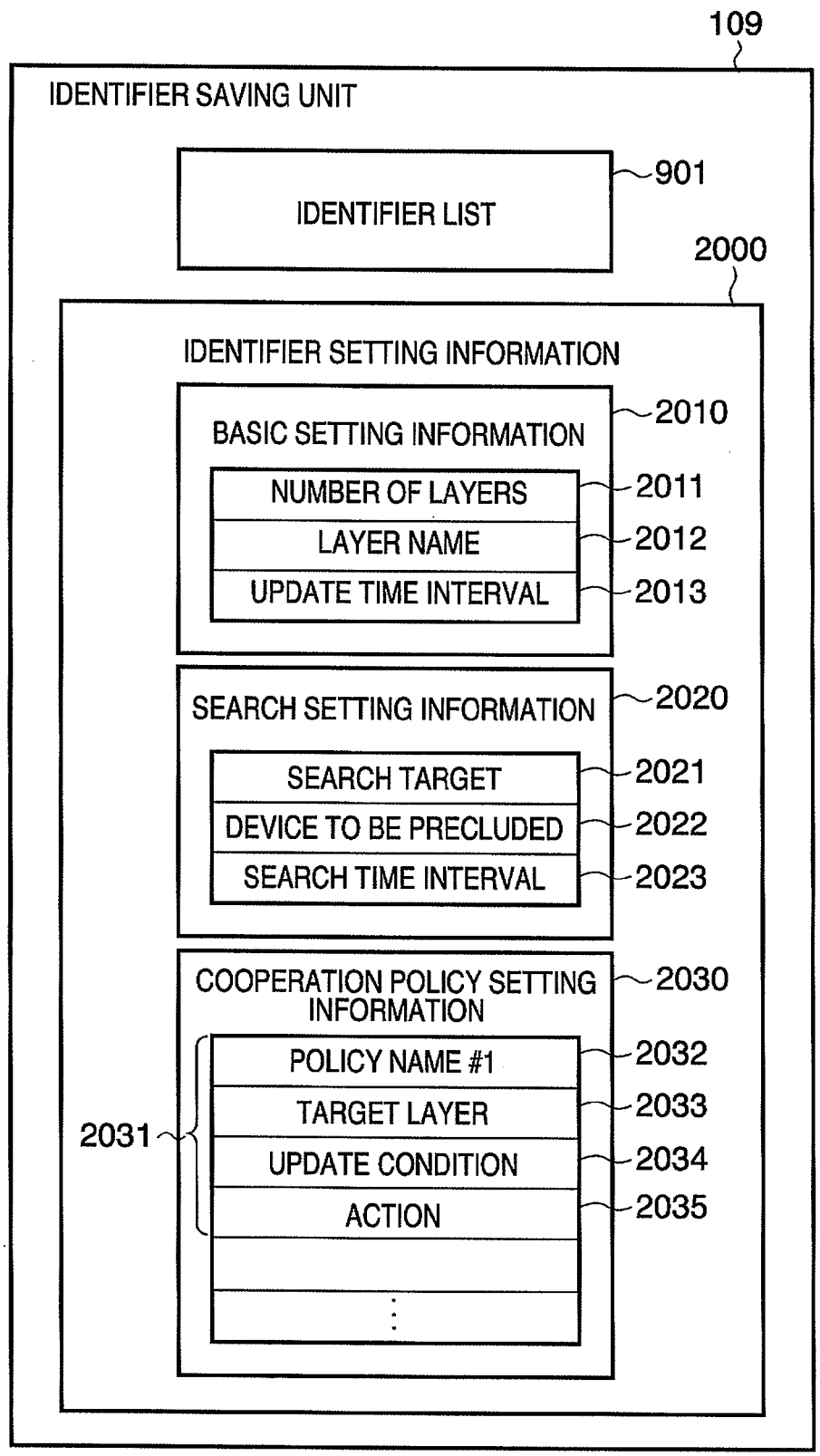
FIG. 20 shows an example of data to be saved in an identifier saving unit.

FIG. 20 shows an example of information saved in the identifier saving unit D 109. The identifier saving unit D 109 saves the identifier list 901, and identifier setting information 2000 set on the user interfaces shown in FIGS. 13, 15, and 16. The identifier setting information 2000 includes basic setting information 2010, search setting information 2020, and cooperation policy setting information 2030. The basic setting information includes the number 2011 of layers of identifiers, names 2012 of layers (layer names), and an update time interval 2013 upon updating the identifier list.

The search setting information 2020 includes a list (search target) 2021 of addresses of devices as search targets. When a broadcast search is specified, a specific code (e.g., null) or the like is set in this item. The search setting information 2020 also includes a list (device to be precluded) 2020 of addresses of devices to be precluded from a search. Even when a broadcast search is selected, devices having addresses included in the devices to be precluded are precluded from targets to be updated. The search setting information 2020 further includes a search time interval 2023 of cooperation devices. The search target 2021 saves IP addresses if the specified condition is "match of address", group names if it is "match of group", or user names if it is "match of user name".

The cooperation policy setting information 2030 includes zero or one or more sets of policy information 2031. Each set of policy information includes a policy name 2032, target layer 2033, update condition 2034, and action 2035. The target layer 2033 indicates the layer name of identifiers to be updated. The update condition 2034 is information used to specify the condition specified by one of the radio buttons 1703. The action 2035 includes a flag or the like indicating synchronization or addition.

<Update of Identifier List>

Figure 14:
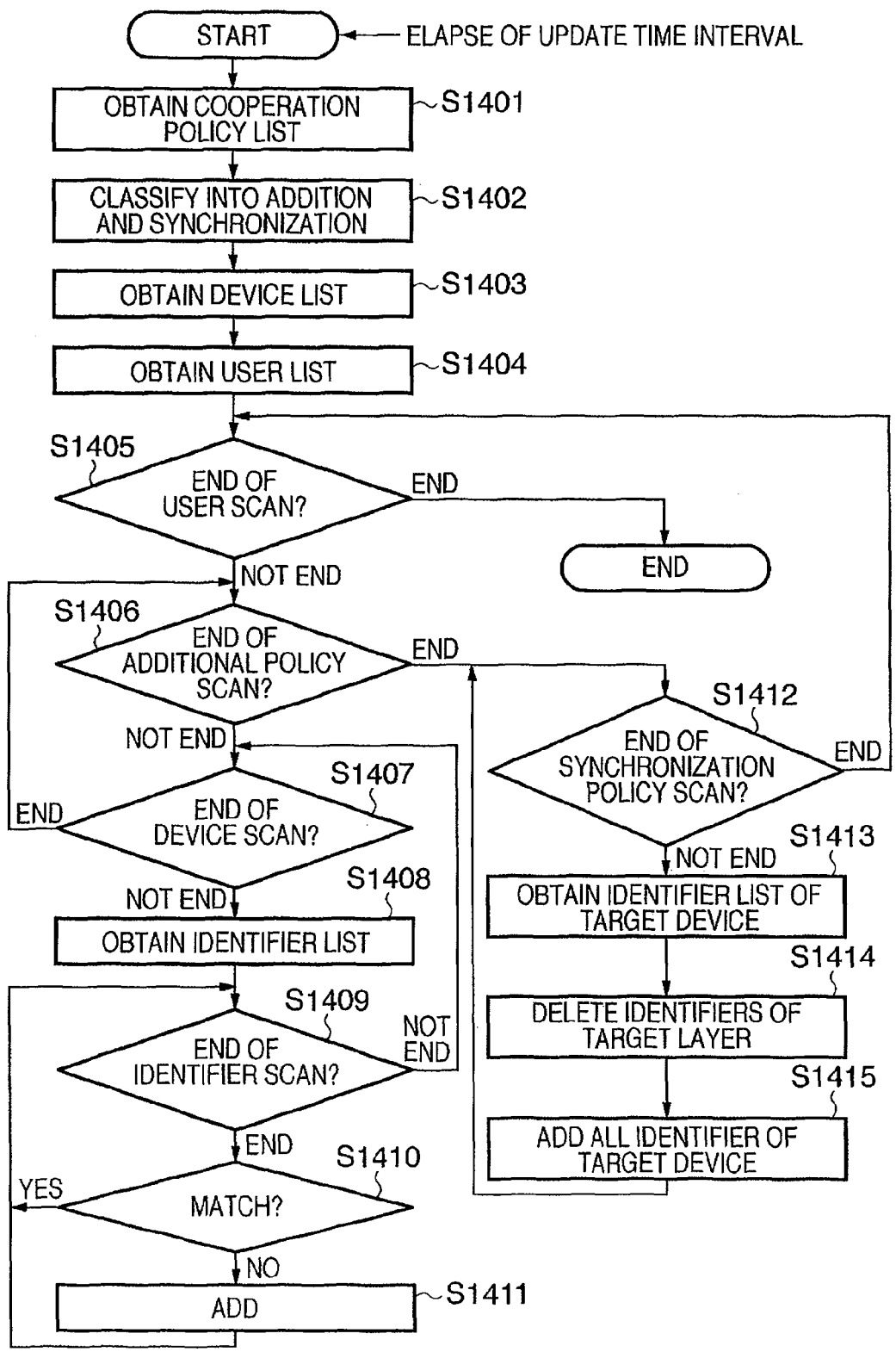
FIG. 14 is a flowchart showing the processing for updating an identifier according to the present invention.

The update operation of the identifier list by the identifier update unit 107 will be described below with reference to the flowchart of FIG. 14. The processing shown in FIG. 14 is executed at a time interval set in the update time interval 2013.

In step S1401, the identifier update unit 107 obtains the cooperation policy setting information 2030. The identifier update unit 107 classifies respective sets of policy information included in the cooperation policy setting information 2030 to those which have additional update as their action and those which have synchronous update as their action with reference to their action settings 2035. The identifier update unit 107 respectively stores the classified sets of policy information in an addition policy list and synchronization policy list.

In step S1403, the identifier update unit 107 obtains a list (device list) of IP addresses of other devices serving as cooperation partners. The device list is generated based on the search setting information 2020. The device list is written with IP addresses or an IP address range included in the search target 2021 in case of the address-specified search or the broadcast address in case of the broadcast search. When the devices 2022 to be precluded are specified, their IP addresses are precluded from the search targets. However, when the broadcast search is set, the identifier lists of devices to be precluded may be deleted from collected identifier lists. The device list is generated at a time interval specified in the search time interval 2023 asynchronously from the processing in FIG. 14.

In step S1404, the identifier update unit 107 obtains a list (user list) of user names associated with corresponding group names for which the use of respective devices are authorized. The identifier update unit 107 obtains this user list by sending a request to the server 103 in this example. The user list describes the user names and their groups in correspondence with addresses of devices.

In step S1405, the identifier update unit 107 obtains one user name and corresponding group name from the user list (to be referred to as an interest user hereinafter). If all interest users have been obtained, the processing ends. Note that executing processing user by user in turn will be referred to as a scan hereinafter.

In step S1406, the identifier update unit 107 obtains one set of policy information from the addition policy list generated in step S1402 (to be referred to as interest policy information hereinafter). If all sets of interest policy information have already been obtained, the process advances to step S1412. Otherwise, the process advances to step S1407. Note that executing processing set by set in turn will be referred to as a scan hereinafter.

In step S1407, the identifier update unit 107 sequentially reads one IP address from the device list obtained in step S1403 (to be referred to as an interest IP address or interest device). If all interest IP addresses or devices have already been read, the process advances to step S1406. Otherwise the process advances to step S1408.

In step S1408, the identifier update unit 107 communicates with the interest device read in step S1407 to obtain the identifier list saved in the interest device.

In step S1409, the identifier update unit 107 read one identifier from the identifier list obtained in step S1408 (to be referred to as an interest identifier hereinafter). If all interest identifiers have already been read, the process advances to step S1407.

The identifier update unit 107 checks in step S1410 if the layer of the interest identifier matches that specified by the target layer 2033 of the interest policy, and the interest device or user matches the condition specified by the update condition 2034 included in the interest policy information. For example, when "match of user name" is specified as the update condition, if the user associated with the interest identifier matches the user name specified by the update condition, the unit 107 determines that the condition is met. When "match of group" is specified as the update condition, if the group associated with the interest identifier matches that specified by the update condition, the unit 107 determines that the condition is met. When "match of IP address" is specified as the update condition, if the IP address of the interest device matches that specified by the condition, the unit 107 determines that the condition is met. If the condition is met, the process returns to step S1409; otherwise, the process advances to step S1411.

In step S1411, the identifier update unit 107 adds the interest identifier read in step S1409 to the self identifier list 901.

On the other hand, in step S1412 the identifier update unit 107 reads one set of policy information from the synchronization policy list classified in step S1402 as new interest policy information. If all sets of interest policy information have already been read, the processing ends.

In step S1413, the interest policy information obtains an identifier list from a target device. If the update condition 2034 is "match of IP address", the target device is a device having the specified IP address. If the update condition 2034 is "match of group", the target device is a device associated with the specified group name in the user list. If the update condition 2034 is "match of user name", the target device is a device associated with the specified user name in the user list. If there are a plurality of associated devices, the identifier update unit 107 obtains information indicating use records of devices by the respective users or groups. The unit identifier update 107 selects a device with a highest frequency of use as the target device. Of course, the identifier update unit 107 may obtain an identifier list from a device having an IP address which is independently input and saved as the target device.

In step S1414, the identifier update unit 107 deletes, from the identifier list 901, all identifiers which belong to the layer (to be referred to as a layer to be synchronized hereinafter) specified by the target layer 2033 of the interest policy. In step S1415, the identifier update unit 107 adds identifiers of the layer to be synchronized included in the identifier list obtained in step S1413 to the identifier list 901. That is, the identifier update unit 107 replaces the identifiers which are included in the identifier list 901 and belong to the layer to be synchronized by those of the layer to be synchronized which are included in the identifier list obtained in step S1413.

Note that step S1405 is the end checking process of the loop processing for adding an identifier to the identifier list while changing the interest user. With this loop processing, an identifier added by the device 101 can be used by other devices. More specifically, step S1405 is the processing for adding, when user 1 of the device 101 is selected as the interest user and if an identifier list obtained from another device as a cooperation partner includes an identifier X of user 1, the identifier X to the identifier list of user 1.

With the aforementioned sequence, the identifier list 901 can be updated. As described above, each device holds the identifier list, and provides identifiers to the client. There are many network systems to which a plurality of devices are connected. In this embodiment, a plurality of devices exchange identifier lists with each other to update their identifier lists, thus sharing the identifier lists among the devices. Upon updating, a target device can be specified. For this reason, when a device group which is authorized to be used for each user is set, that device group is set as that in which identifier lists are exchanged, and the identifier list can be shared in that group.

Note that the device 101 not only executes the sequence shown in FIG. 14 but also becomes a communication partner of the sequence of FIG. 14, which is executed by another device. That is, when the device 101 is required to send the identifier list or user list from another device, it transmits the identifier list or user list to the device as the request source in response to that request.

Also, the checking process in step S1405 in FIG. 15 may be omitted. In this case, if "end" is determined in step S1412, the overall identifier update processing ends.

<Practical Example>

Figure 18:
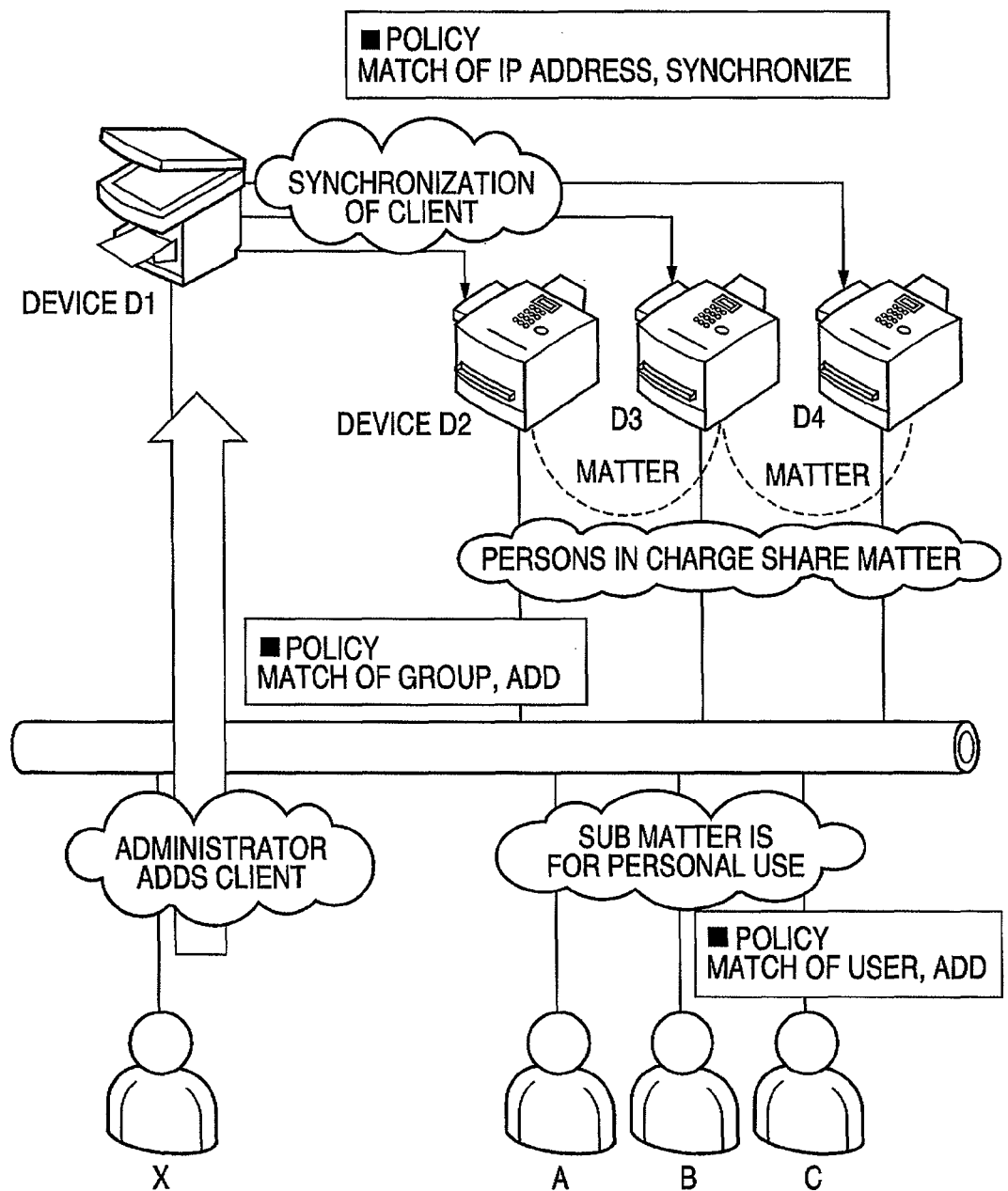
FIG. 18 is a view showing a practical application example of the present invention.

FIG. 18 shows a practical example to which the present invention is applied. This is an example of the case wherein the present invention is actually applied to a law firm or the like. Three persons A, B, and C have charge of certain company XYZ, and leader X manages these three persons. X uses a device D1 (e.g., MFP), and recognizes who are clients. A, B, and C selectively use devices D2, D3, and D4 according to the characteristics of the devices. X adds an identifier of a client to an identifier list held by the device D1. Since the client is a billing destination of expenses, this list cannot be incorrect. Hence, as the cooperation policy of the client layer, a "synchronization" action is selected for the device D1 as a target device. A, B, and C add matters according to businesses. There are a very large number of matters. Hence, matters added by other persons may be shared in place of being individually added. Sub matters are used as notes by respective persons. A, B, and C selectively use the devices D2, D3, and D4 as usage. However, it is inefficient to add a sub matter, which was added to D2, again to D3 when it is used. On the other hand, if sub matters added by other persons are seen, they are impeditive. Therefore, an "add by user" policy is set.

The programs of the aforementioned computers 102 and 103 and the MFPs 101 and 104 according to the present invention may be executed by the computers and MFPs by externally installed programs. In this case, these programs are supplied using storage media. Alternatively, an information group including programs are supplied by loading it from an external storage medium to the computers and MFPs via a network. The present invention can be applied to either case.

Figure 19:
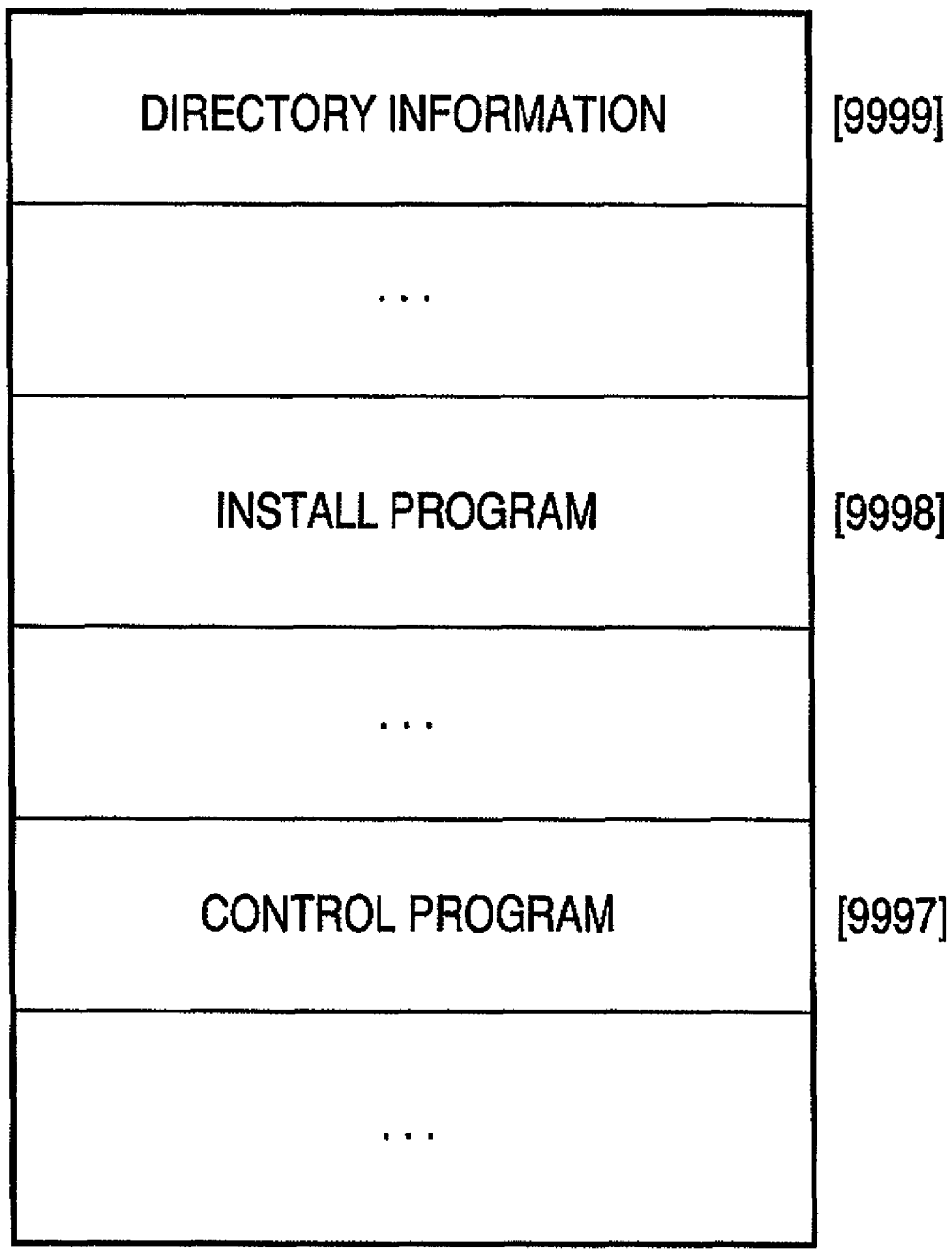
FIG. 19 shows a memory map of a CD-ROM as an example of a recording medium.

FIG. 19 shows the memory map of a CD-ROM as an example of the storage medium. Reference numeral 9999 denotes an area for storing directory information. This area indicates the locations of an area 9998 which stores an install program and an area 9997 which stores a control program of a print client or network printer. The area 9998 stores the install program. The area 9997 stores the control program of the computer or MFP. Upon installing the control program of the computer or copying machine of the present invention in the computer or MFP, the install program stored in the area 9998 is loaded to the system, and is executed by the CPU 301. The install program executed by the CPU 301 reads out the control program from the area 9997 and installs it in the computer or MFP.

Note that the present invention may be applied to a system or an integrated apparatus configured by a plurality of devices (e.g., a scanner, printer, network storage, and the like), or an apparatus including a single device.

The objects of the invention are also achieved by executing a program code of software that implements the functions of the aforementioned embodiments (1) by supplying a storage medium which records the program code to a system or apparatus, or (2) by reading out and executing the program code stored in the storage medium by a computer (or a CPU or MPU) of that system or apparatus. In this case, the program code itself read out from the storage medium implements the novel functions of the present invention, and the storage medium which stores the program code constitutes the present invention.

As the storage medium used to supply the program code, for example, a floppy Disk®, hard disk, optical disk, magneto-optical disk, CD-ROM, CD-R, magnetic tape, nonvolatile memory card, ROM, and the like can be used.

The functions of the aforementioned embodiments may be implemented when the computer executes the readout program code.

Alternatively, the functions of the aforementioned embodiments may be implemented by some or all of actual processes executed by an OS running on the computer according to instructions of the program code.

Furthermore, the functions of the aforementioned embodiments may be implemented in the following forms.

(1) The program code read out from the storage medium is written in a memory equipped on a function expansion board or function expansion unit which is inserted in or connected to the computer.

(2) After the program code is written in the memory, a CPU or the like equipped on the function expansion board or unit executes some or all of actual processes according to instructions of the program code.

Note that the present invention can also be applied to a case in which from the storage medium which records the program code of software that implements the functions of the aforementioned embodiments, that program is delivered to a requester via a communication line such as the Internet or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-28446, filed Feb. 7, 2007, which is hereby incorporated by reference herein in its entirety.

What is claimed is:

1. A printing apparatus connected to a network, comprising:
a storage constructed to store an identifier list, in which each of a plurality of identifiers is registered in a respective layer;
an obtaining unit constructed to obtain an external identifier list from an external apparatus via the network;
an updating unit constructed to update the stored identifier list stored in the storage based on the obtained external identifier list obtained by the obtaining unit, in accordance with an update rule; and
a display constructed to display a setting screen for setting the update rule, wherein the update rule designates a layer which includes a designated identifier to be used to update the stored identifier list when the stored identifier list is updated,
wherein said updating unit updates the stored identifier list from the obtained external identifier list, using the identifier designated by the update rule set in the setting screen displayed by said display unit,
wherein a job identifier and a set of identifiers are set to a job, wherein each identifier of the set of identifiers is different from the job identifier, and wherein each identifier of the set of identifiers respectively belongs to a different layer, and
wherein an accounting destination to be charged for execution of the job is identified by the set of identifiers.

2. The apparatus according to claim 1, further comprising a transmitter constructed to transmit the stored identifier list to a client terminal in response to a request from the client terminal as an issuer of a print job.

3. The apparatus according to claim 1, further comprising:
a print executer constructed to execute a print job received together with an identifier from a client terminal; and
a history saver constructed to save an execution history of the print job together with the identifier.

4. The apparatus according to claim 1, further comprising a device information storage constructed to store device information for designating the external apparatus from which the external identifier list is obtained by said obtaining unit.

5. The apparatus according to claim 1, wherein the display displays the setting screen on which the update rule can be set based upon information of a user who has registered or generated a layer managed corresponding to an identifier contained in the obtained external identifier list, or information of a group to which the user belongs.

6. The apparatus according to claim 1, further comprising a manager configured to manage a user authorized to use the printing apparatus associated with a group to which the user belongs,
wherein said update unit updates the stored identifier list in conformity with the update rule when a user managed by said manager or a group to which the user belongs matches with a user managed associated with the identifier contained in the obtained external identifier list or a group to which the user belongs.

7. A method for controlling a printing apparatus comprising:
a storing step of storing an identifier list, in which each of a plurality of identifiers is registered in a respective layer;
an obtaining step of obtaining an external identifier list from an external apparatus via the network;
an updating step of updating the stored identifier list stored in the storing step based on the obtained external identifier list obtained in said obtaining step, in accordance with an update rule; and
a displaying step of displaying a setting screen for setting the update rule, wherein the update rule designates a layer which includes a designated identifier to be used to update the stored identifier list when the stored identifier list is updated,
wherein, in said updating step, the stored identifier list is updated from the obtained external identifier list, using the identifier designated by the update rule set in the setting screen displayed in said displaying step,
wherein a job identifier and a set of identifiers are set to a job, wherein each identifier of the set of identifiers is different from the job identifier, and wherein each identifier of the set of identifiers respectively belongs to a different layer, and
wherein an accounting destination to be charged for execution of the job is identified by the set of identifiers.

8. The method according to claim 7, further comprising a transmitting step of transmitting the stored identifier list to a client terminal in response to a request from the client terminal as an issuer of a print job.

9. The method according to claim 7, further comprising:
a print executing step of executing a print job received together with an identifier from a client terminal; and
a history saving step of saving an execution history of the print job together with the identifier.

10. The method according to claim 7, further comprising a device information storing step of storing device information for designating the external apparatus from which the external identifier list is obtained in said obtaining step.

11. The method according to claim 7, wherein, in said displaying step, the setting screen is displayed, on which the update rule can be set based upon information of a user who has registered or generated a layer managed corresponding to an identifier contained in the obtained external identifier list, or information of a group to which the user belongs.

12. The method according to claim 7, further comprising a managing step of managing a user authorized to use the printing apparatus associated with a group to which the user belongs,
wherein, in said updating step, the stored identifier list is updated in conformity with the update rule when a user managed by said managing means or a group to which the user belongs matches with a user managed associated with the identifier contained in the obtained external identifier list or a group to which the user belongs.

13. A computer readable medium storing a computer program that causes a computer to perform a method for controlling a printing apparatus connected to a network, said method comprising:
a storing step of storing an identifier list, in which each of a plurality of identifiers is registered in a respective layer;
an obtaining step of obtaining an external identifier list from an external apparatus via the network;
an updating step of updating the stored identifier list stored in the storing step based on the obtained external identifier list obtained in said obtaining step, in accordance with an update rule; and a displaying step of displaying a setting screen for setting the update rule, wherein the update rule designates a layer which includes a designated identifier to be used to update the stored identifier list when the stored identifier list is updated, wherein, in said updating step, the stored identifier list is updated from the obtained external identifier list, using the identifier designated by the update rule set in the setting screen displayed in said displaying step, wherein a job identifier and a set of identifiers are set to a job, wherein each identifier of the set of identifiers is different from the job identifier, and wherein each identifier of the set of identifiers respectively belongs to a different layer, and wherein an accounting destination to be charged for execution of the job is identified by the set of identifiers.

14. The computer readable medium according to claim 13, wherein the method further comprises transmitting step of transmitting the stored identifier list to a client terminal in response to a request from the client terminal as an issuer of a print job.

15. The computer readable medium according to claim 13, wherein the method further comprises:

a print executing step of executing a print job received together with an identifier from a client terminal; and a history saving step of saving an execution history of the print job together with the identifier.

16. The computer readable medium according to claim 13, wherein the method further comprises a device information storing step of storing device information for designating the external apparatus from which the external identifier list is obtained in said obtaining step.

17. The computer readable medium according to claim 13, wherein, in said displaying step, the setting screen is displayed, on which the update rule can be set based upon information of a user who has registered or generated a layer managed corresponding to an identifier contained in the obtained external identifier list, or information of a group to which the user belongs.

18. The computer readable medium according to claim 13, wherein the method further comprises a managing step of managing a user authorized to use the printing apparatus associated with a group to which the user belongs, wherein, in said updating step, the stored identifier list is updated in conformity with the update rule when a user managed by said managing means or a group to which the user belongs matches with a user managed associated with the identifier contained in the obtained external identifier list or a group to which the user belongs.

* * * * *